P. KAISER.
INCUBATOR.
APPLICATION FILED MAY 12, 1917.

1,264,526.

Patented Apr. 30, 1918.
2 SHEETS—SHEET 1.

P. KAISER.
INCUBATOR.
APPLICATION FILED MAY 12, 1917.

1,264,526.

Patented Apr. 30, 1918.
2 SHEETS—SHEET 2.

Witnesses:
W. F. Kilroy
Harry R. L. White

Inventor:
Peter Kaiser
By John Howard McElroy
his Atty

UNITED STATES PATENT OFFICE.

PETER KAISER, OF CROWN POINT, INDIANA, ASSIGNOR TO 103 DEGREE INCUBATOR COMPANY, OF CROWN POINT, INDIANA, A CORPORATION OF INDIANA.

INCUBATOR.

1,264,526.          Specification of Letters Patent.      Patented Apr. 30, 1918.

Application filed May 12, 1917. Serial No. 168,102.

*To all whom it may concern:*

Be it known that I, PETER KAISER, a citizen of the United States, and a resident of Crown Point, in the county of Lake and State of Indiana, have invented certain new and useful Improvements in Incubators, of which the following is a full, clear, and exact specification.

My invention is concerned with incubators of the character shown in my Patents Nos. 1,190,418, 1,190,419 and 1,190,420, and is designed to improve incubators and brooders generally by a novel construction in which the lamp which supplies the heat is moved away from the boiler and also from the incubator body, so as not only to allow the temperature to fall at once, but to remove the direct heating action of the lamp.

To illustrate my invention, I annex hereto two sheets of drawings, in which the same reference characters are used to designate identical parts in all the figures, of which—

Figure 1:
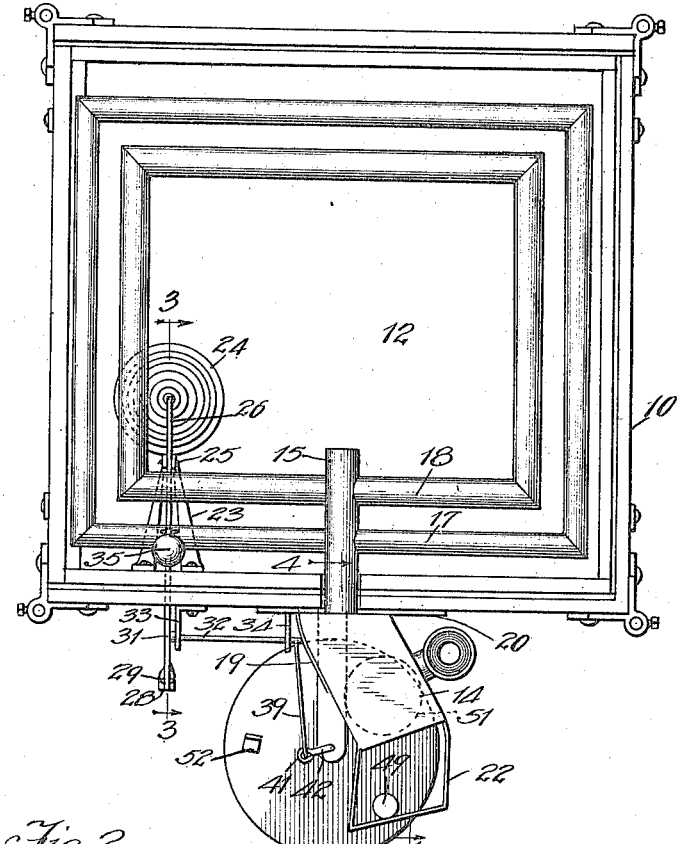
Figure 1 is a top plan view of an incubator embodying my invention, having the top cover removed.
Figure 2:
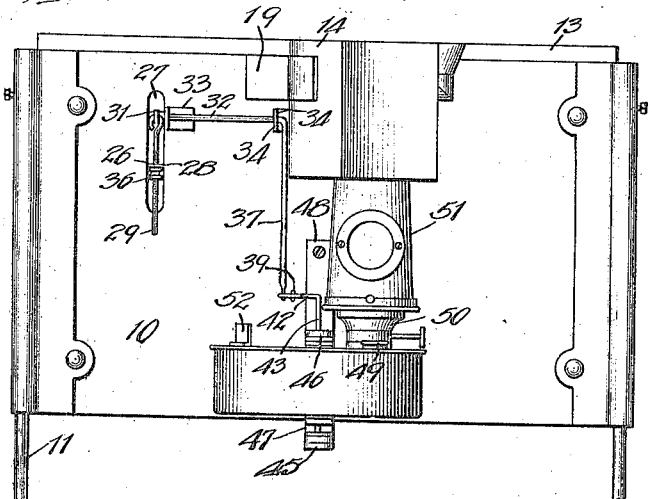
Fig. 2 is a side elevation of the lamp side of the incubator.

In illustrating my invention, I have shown it as applied to an incubator of the type shown in my aforesaid Patent No. 1,190,419, where 10 represents the customary rectangular wooden casing suitably supported above the floor by the legs 11, and provided with the bottom 12 and the top 13, all of which may be of any customary and desired construction. As a preferred means of transmitting heat steadily to the interior of the casing from the lamp, I have illustrated a boiler 14, which is connected by a pair of pipes 15 and 16 to the two sets of rectangular piping 17 and 18 placed in the interior of the incubator and adapted as heat is applied to the bottom of the boiler to circulate the heated water throughout the system of piping to maintain a temperature in the casing controlled by the temperature of the circulating water. The boiler 14 may be of any desired shape, and is preferably formed of sheet metal, and is secured to the side of the casing in any suitable manner, as by the metallic strips 19 and 20, which are suitably shaped so that they can be secured both to the sides of the casing and to the sides of the boiler. The boiler is preferably in the form of a shell provided with one or more vertical tubes 21 through which the heat rising from the lamp can pass. I may provide an open extension 22 from the boiler, which serves as an extension of the chimney when it is swung away from beneath the boiler, as will be hereinafter explained.

To control the temperature, I secure in the interior of the casing a bracket 23, and upon the outer end of this bracket I secure one side of a thermostat disk 24, which expands under the action of heat in the customary manner. The bracket 23 is also provided with a bearing fulcrum 25 for a lever 26, the inner end of which rests on the center of the thermostat element 24. Its other arm passes out through the vertical slot 27 in the casing, and is provided with the flattened end 28 having an aperture therein through which passes the adjustable connecting link 29, the hooked upper end of which is secured in the aperture 30 of the overweighted lever 31, which is secured on the adjacent end of a rock shaft 32, which is journaled in a pair of bearing brackets 33 and 34 secured to the side of the casing. The other arm of this overweighted lever 31 preferably extends into the inside of the casing through the upper portion of the slot 27, where it is provided with a weight 35, which tends to pull up on the link 29, the lower end of which is threaded and provided with a set nut 36 by which the effective length of the link can be regulated. The rock shaft 32 has secured to or formed on its inner end a downwardly projecting arm 37, the lower end of which has an aperture through which is secured the hook end 38 of a link 39, the outer hook end 40 of which engages the hook end 41 of the short arm 42 projecting outward from the vertical shaft 43, which passes through the center of the bowl 44 of the lamp, this shaft 43 forming a journal for the lamp bowl in the bearings 45 and 46 formed on the outer ends of the bearing brackets 47 and 48 secured to the side of the casing. The lamp bowl is provided with the customary eccentric filling cap 49, and has its burner 50 provided with the customary chimney 51 located eccentrically thereon. The lamp bowl also has the stop lug 52 secured on its upper surface.

Figure 3:
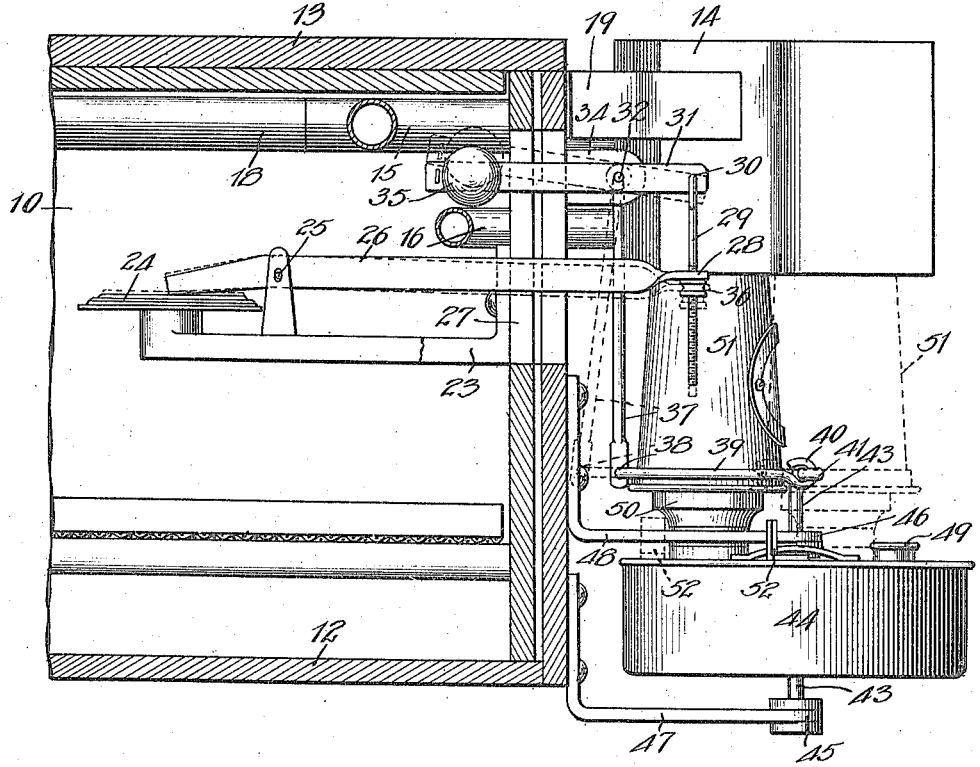
Fig. 3 is a vertical section, on an enlarged scale, on the line 3—3 of Fig. 1.
Figure 4:
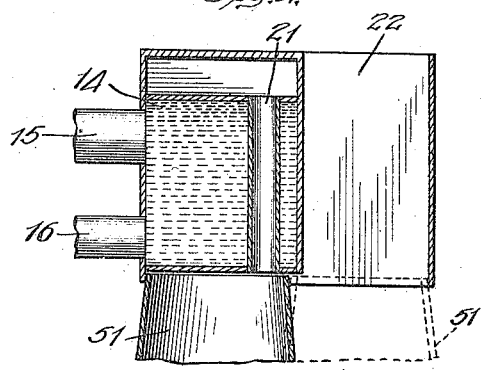
Fig. 4 is a detail through the boiler, in section, on substantially the line 4—4 of Fig. 1.

The operation of my improved incubator will be readily apparent. Assuming that it is set by the adjustment of the nut 36 to keep the temperature of the interior of the casing at 103 degrees, the lamp bowl 44 stands in the position shown in full lines in Fig. 3, so that the chimney 51 has the upper end directly beneath the boiler 14, and all the heat emanating from the chimney is effective in heating the water and keeping up the temperature. If it rises beyond the temperature for which the apparatus is set, the inner end of the lever 36 is raised, forcing down the outer end, as indicated in dotted lines in Fig. 3, and this pulls down the nut 36 and the link 29, rocking the shaft 32 and carrying the arm 37 back toward its dotted-line position, and as it moves back, the link 39 causes the lamp to rotate on its vertical axis, carrying the chimney to the dotted-line position, in which the heat is discharged up through the extension 22 of the boiler. This movement of the lamp under the action of the thermostat is limited by the engagement of the lug 52 with the bracket 48, and it will be understood that as soon as the heat of the lamp is removed from the boiler, the temperature will begin to fall until the weight 35 is free to act on the train of connections shown and rock the lamp back into its normal position.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with a casing, of a heat-receiving element outside of the casing provided with means for transmitting the heat applied thereto steadily to the interior of the casing, a lamp bowl pivoted at its center outside the casing and having a burner eccentrically mounted on the bowl and adapted normally to stand beneath the heat-receiving element, a thermostat element in the casing, and connections between the thermostat element and the lamp bowl whereby the latter will be rotated to move the burner away from the heat-receiving element when the desired temperature is exceeded.

2. In a device of the class described, the combination with a casing, of a heat-receiving element outside of the casing provided with means for transmitting heat applied thereto steadily to the interior of the casing, a lamp bowl pivoted at its center outside of the casing, a burner eccentrically mounted on the bowl and adapted normally to apply its heat to the heat-receiving element, a thermostat element in the casing, a thermostat lever having its power arm connected to the thermostat element, a rocking element, an over-weighted lever forming a part thereof, a link connecting the thermostat lever and an arm of the overweighted lever, a downwardly projecting arm of the rocking element, and an arm on the lamp bowl, and a link connecting the downwardly projecting arm and the arm on the lamp bowl, substantially as described.

3. In a device of the class described, the combination with a casing, of a heat-receiving element outside of the casing provided with means for transmitting heat applied thereto steadily to the interior of the casing, a lamp bowl pivoted at its center, a burner eccentrically mounted on the bowl and normally standing beneath the heat-receiving element, a thermostat element in the casing, a thermostat lever having its power end connected to the thermostat element and its outer end extending to the outside of the casing, a rock shaft, an overweighted lever secured on the rock shaft, a link connecting the thermostat lever and one arm of the overweighted lever, a downwardly projecting arm on the rock shaft, a horizontally extending arm secured to the lamp bowl, and a link connecting the last two mentioned arms.

In witness whereof, I have hereunto set my hand and affixed my seal, this 4th day of May, A. D. 1917.

PETER KAISER. [L. S.]

Witnesses:
MARTIN J. SMITH,
C. D. ROOT.

Copies of this patent may be obtained for five cents each, by addressing the "Commissioner of Patents Washington, D. C."